United States Patent [19]
Okada et al.

[11] 3,873,767
[45] Mar. 25, 1975

[54] VIDEO SIGNAL CONTROL CIRCUIT INCLUDING AUTOMATIC BRIGHTNESS AND CONTRAST CONTROL RESPONSIVE TO EXCESS CRT BEAM CURRENT

[75] Inventors: Takashi Okada, Yamato; Yoshiaki Ogawara, Inagi-shi, Tokyo, both of Japan

[73] Assignee: Sony Corporation, Tokyo, Japan

[22] Filed: Aug. 28, 1973

[21] Appl. No.: 392,201

[30] Foreign Application Priority Data

Aug. 28, 1972 Japan .............................. 47-85947

[52] U.S. Cl. ......................... 178/7.5 R, 178/7.5 DC
[51] Int. Cl. .......................... H04n 5/48, H04n 5/14
[58] Field of Search ........ 178/7.3 R, 7.3 DC, 7.5 R, 178/7.5 DC

[56] References Cited

UNITED STATES PATENTS

| | | | |
|---|---|---|---|
| 3,009,989 | 11/1961 | Ahrons et al. | 178/7.5 R |
| 3,535,444 | 10/1970 | Anderson et al. | 178/7.3 R |
| 3,622,696 | 11/1971 | MacIntyre, Jr. | 178/7.5 R |
| 3,735,029 | 5/1973 | Sunstein | 178/7.5 R |
| 3,804,981 | 4/1974 | Avins | 178/7.3 R |

*Primary Examiner*—Robert L. Griffin
*Assistant Examiner*—George G. Stellar
*Attorney, Agent, or Firm*—Lewis H. Eslinger; Alvin Sinderbrand

[57] ABSTRACT

A video signal control circuit having a video amplifier and a signal transmission channel coupled to the video amplifier for supplying a video signal to a cathode ray tube includes a brightness control circuit responsive to the manual operation thereof to vary the DC potential applied to the signal transmission channel and a contrast control circuit responsive to the manual operation thereof to vary the gain of the video amplifier. A first voltage supply is provided to supply a DC voltage to the video amplifier and to the signal transmission channel. A second voltage supply is provided to supply a gain determining voltage to a gain control circuit coupled to the video amplifier. Level control means are coupled to the signal transmission channel and responsive to the voltage supplied by the second voltage supply for compensating variations in the DC potential on the signal transmission channel when the contrast control means causes a variation in the gain determining voltage, to thereby minimize variations in the brightness of an image displayed on the viewing screen of the cathode ray tube when the contrast thereof is varied. A brightness limiting circuit is coupled to the first and second voltage supplies and is responsive to a cathode ray tube beam current in excess of a predetermined value for varying the voltage supplied by both said first and second voltage supplies to thereby simultaneously vary the DC potential applied to the signal transmission channel and the gain of the video amplifier, whereby the brightness of an image displayed by the cathode ray tube is limited and the contrast of said image is reduced.

12 Claims, 3 Drawing Figures

VIDEO SIGNAL CONTROL CIRCUIT INCLUDING AUTOMATIC BRIGHTNESS AND CONTRAST CONTROL RESPONSIVE TO EXCESS CRT BEAM CURRENT

BACKGROUND OF THE INVENTION

This invention relates to video signal control circuits for a television receiver, and more particularly, to a multi-functional control circuit operable upon video signals whereby the brightness and contrast of an image displayed on the screen of a cathode ray tube included in the television receiver may be manually adjusted and whereby the brightness of the displayed images is automatically limited In a commercial television receiver, it is necessary that the brightness and contrast of a displayed image be controllable in accordance with the particular observational preferences and visual perceptivity of an individual viewer. Preferably, such adjustments in brightness and contrast should be capable of independent implementation by simple manual operation. The necessary control circuits, provided for brightness and contrast adjustment are, desirably, of simple and inexpensive construction.

To effect the foregoing, the prior art has proposed a video signal transmission channel comprised of a plurality of active operating elements, such as transistor devices or the like, connected in series relationship, usually in the absence of an AC coupling capacitor, to form a signal path for a video signal whereby the transmission characteristics of the DC component of said video signal are varied. In accordance with the current state of technology, such video signal transmission channel is provided in the form of an integrated circuit. However, it has been found that such video signal transmission channels might be subjected to video signals of sufficiently large amplitudes attended by correspondingly high average DC levels applied to the cathode ray tube resulting in an unusually excessive average beam current flowing from a high voltage supply circuit to the cathode ray tube included in the television receiver. To control the scanning of the cathode ray tube, the television receiver usually includes a switching element, a flyback transformer and a rectifier operably connected. As a result of the excessive average beam current, the switching element, which preferably comprises a transistor device to supply a pulse to the flyback transformer, is exposed to the ever present danger of destruction. To limit the average DC level of the video signal such that excessive beam currents are prevented, some improved television receivers include circuitry to automatically regulate the brightness of a displayed image. Such circuitry is the so-called automatic-brightness-limiter circuit.

Typically, the automatic-brightness-limiter circuit serves to detect an average beam current that exceeds a predetermined value and to then limit the amplitude of the video signal supplied to the cathode ray tube in order to reduce or otherwise maintain the average beam current to acceptably safe levels. However, since the automatic-brightness-limiter circuit operates in response to detected average beam current, it has been found that the conventional circuit suffers from the attendant disadvantage that the limited video signal may include a portion having intrinsically low brightness, which portion is not faithfully reproduced upon the screen of the cathode ray tube. Consequently, the displayed image is not a true representation of the received video signal resulting in poor fidelity of the reproduced image. This obtains because the automatic brightness limiter circuit of prior art design operates upon the entire video signal in response to a detected average beam current so that although the DC level of the large amplitude video signal is properly reduced, a low amplitude video signal is likewise reduced, often below the visual threshold level of the cathode ray tube. Accordingly, that portion of the video signal admitting of low amplitude, i.e., that portion of the image having low brightness levels, is not accurately reproduced.

OBJECTS OF THE INVENTION

Therefore, it is an object of the present invention to provide an improved video signal control circuit for permitting brightness and contrast adjustment of images displayed by a cathode ray tube in response to received video signals.

It is another object of the present invention to provide improved brightness and contrast control circuitry for use in commercial television receivers wherein adjustments in the brightness and contrast of an image are independently and manually effected and wherein the brightness of the displayed image is automatically limited.

A further object of the present invention is to provide brightness and contrast control circuitry for a television receiver including an improved automatic brightness limiter circuit that does not cause deterioration in the reproduced image.

Yet another object of the present invention is to provide an automatic brightness limiter circuit that is cooperable with a brightness and contrast control circuit for use in a television receiver, said improved automatic brightness limiter circuit being operable to limit the maximum brightness of a displayed image that is accurately reproduced from received video signals.

Yet another object of the present invention is to provide brightness and contrast control circuitry wherein adjustments in the contrast of a displayed image are not accompanied by undersirable variations in the brightness thereof.

A still further object of the instant invention is to provide an improved automatic brightness limiting circuit that permits the accurate reproduction of a displayed image in response to low amplitude video signals while limiting the average cathode ray tube beam current to a predetermined value.

It is another object of the instant invention to provide a brightness and contrast control circuit including an improved automatic brightness limiting circuit that prevents the flow of excessive average cathode ray tube beam currents without an accompanying degradation in a reproduced image.

It is a still further object of this invention to provide an improved brightness and contrast control circuit that is readily adapted to be manufactured in the form of an integrated circuit.

Various other objects and advantages of the invention will become clear from the following detailed description of an exemplary embodiment thereof and the novel features will be particularly pointed out in connection with the appended claims.

SUMMARY OF THE INVENTION

In accordance with the present invention, an improved video signal control circuit including a video amplifier and a video signal transmission channel is provided including gain control means coupled to the video amplifier for controlling the gain thereof to effect an adjustment in the contrast of an image displayed by a cathode ray tube; first voltage supply means is coupled to the video amplifier and the signal transmission chanel; second voltage supply means is coupled to the gain control means for supplying a gain determining voltage thereto; brightness control means is coupled to the first voltage supply means and is responsive to a manual adjustment for varying the voltage supplied by the first voltage supply means to thereby vary the DC potential applied to the signal transmission channel; contrast control means is coupled to the second voltage supply means and is responsive to a manual adjustment for varying the gain determining voltage supplied to the gain control means; level control means is coupled to the signal transmission channel and is responsive to the voltage supplied by the second voltage supply means for compensating variations in the DC potential applied to the signal transmission channel resulting from a variation in the gain determining voltage to thereby minimize variations in the brightness of a displayed image when the contrast thereof is varied; and brightness limiting means is coupled to the first and second voltage supply means and is responsive to a cathode ray tube beam current in excess of a predetermined value for varying the voltages supplied by both first and second voltage supply means to thereby simultaneously vary the DC potential applied to the signal transmission channel and the gain determining voltage, whereby the brightness of a displayed image is limited and the contrast of said image is reduced.

BRIEF DESCRIPTION OF THE DRAWINGS

The invention will be more clearly understood by reference to the following detailed description of an exemplary embodiment thereof in conjunction with the accompanying drawings in which.

DETAILED DESCRIPTION OF THE INVENTION

Figure 1:
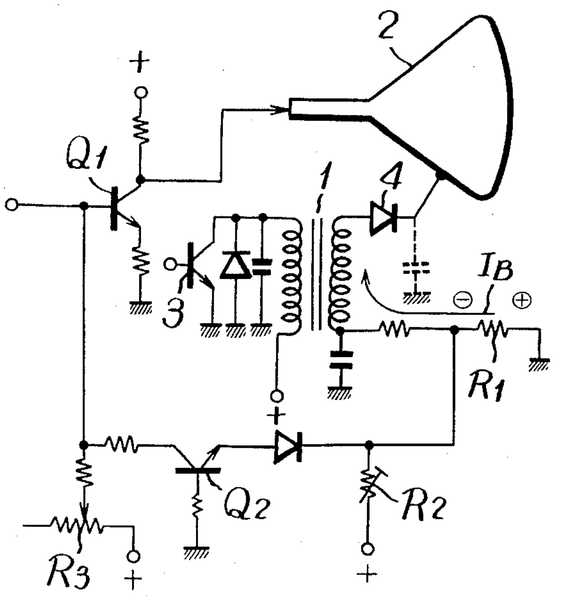
Fig-1 PRIOR ART
FIG. 1 is a schematic circuit diagram showing a conventional prior art video signal control circuit capable of manually adjusting the brightness of reproduced images and, additionally, exhibiting the automatic brightness limiting feature.

The advantages and improvements obtained by the present invention will best be understood once the disadvantages inherent in prior art video control circuits are appreciated. Accordingly, reference is now made to FIG. 1 which schematically illustrates a typical prior art video control circuit for use in a television receiver, comprising a cathode ray tube 2, a beam current supply circuit including flyback transformer 1 and switching transistor 3, a video amplifier and an automatic brightness limiting circuit. The cathode ray tube may comprise a conventional color tube conventionally employed in television receiving apparatus. The beam current is normally supplied to the anode of cathode ray tube 2 from a source of reference potential, such as ground, through a limiting resistor $R_1$ and diode 4. Switching transistor 3 is coupled to the primary winding of flyback transformer 1, the secondary winding of said flyback transformer being included in the series circuit from ground through resistor $R_1$, through diode 4 to the anode of the cathode ray tube. It may be appreciated that diode 4 is adapted to rectify a pulse supplied thereto by flyback transformer 1 to produce the suitable high voltage necessary for the proper operation of cathode ray tube 2.

The video amplifier coupled to cathode ray tube 2 comprises transistor $Q_1$ having an input terminal adapted to receive a video signal communicated thereto. As illustrated, the base electrode of transistor $Q_1$ is coupled to variable resistor $R_3$, such as a potentiometer, having a resistance value that is manually adjustable to permit a corresponding adjustment in the brightness level in the image displayed on cathode ray tube 2. The base electrode of transistor $Q_1$ is additionally connected to an automatic brightness limiting circuit including a transistor $Q_2$ and variable resistor $R_2$. The latter variable resistor is connected in the emitter circuit of transistor $Q_2$ and is further coupled to a suitable source of potential. The resistance value of resistor $R_2$ is adapted to be manually set or otherwise adjusted to establish a brightness limiting level. Variable resistor $R_2$ cooperates with resistor $R_1$ to form a beam current detecting circuit.

Briefly, in operation, the drive signal supplied to the base electrode of switching transistor 3 results in a pulse produced at the primary winding of flyback transformer 1. In response thereto, a beam current $I_B$ flows from ground through resistor $R_1$, through the secondary winding of flyback transformer 1, through diode rectifier 4 to the anode of cathode ray tube 2. Normally, the emitter electrode of transistor $Q_2$ is biased with a positive voltage through variable resistor $R_2$ to exhibit a nonconducting state. The flow of beam current $I_B$ through resistor $R_1$ produces a voltage drop across said resistor, thereby providing a cancelling voltage at the junction defined by resistors $R_1$ and $R_2$ to thereby reduce the positive voltage at the emitter electrode of transistor $Q_2$. When the beam current $I_B$ exceeds a predetermined amount, the negative voltage provided thereby at the junction defined by resistors $R_1$ and $R_2$ effectively cancels the positive bias voltage previously supplied to the emitter electrode of transistor $Q_2$, thereby switching transistor $Q_2$ to its conducting state. As current flows through transistor $Q_2$, the bias potential at the base electode of transistor $Q_1$ is reduced to thereby reduce the amplitude of the video signal amplified thereby and supplied to cathode ray tube 2. As the level of the video signal supplied to the cathode ray tube is decreased, the brightness of the images displayed thereon is likewise suppressed and an excessive beam current $I_B$ is now prevented from flowing through the high voltage generating circuit.

Figure 2:
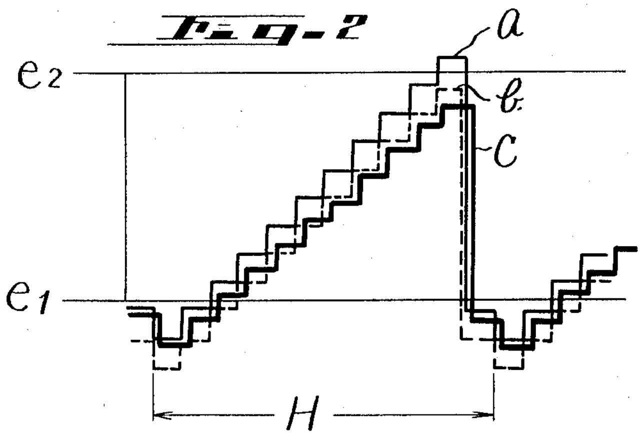
FIG. 2 is a graphical representation of signal waveforms produced by the circuit illustrated in FIG. 1.

Referring to FIG 2, there is illustrated a graphical representation of the waveform *a* of the video signal supplied to cathode ray tube 2 in superposition with respect to the maximum permissible brightness level $e_2$, as determined by the resistance of resistor $R_2$, and an initial threshold voltage $e_1$ required to produce a visible image. When the video signal *a* exceeds the predetermined maximum threshold level $e_2$, the average beam current $I_B$ is sufficiently excessive to switch transistor $Q_2$ into its conducting state to thus result in a decrease in the DC level of video signal *a*. As indicated, the conducting state of transistor $Q_2$ results in a lowering of the DC level such that video signal *a* is now represented by the broken curve *b*. However, it is apparent that a portion of the original video signal *a* having relatively low amplitude, but nevertheless admitting of a sufficient brightness component to be visible, is now reduced below the initial threshold level $e_1$ of cathode ray tube 2. Thus, that portion of the video signal *a* which should be reproduced upon the display screen of the cathode ray tube 2 is here not reproduced. Thus, it is appreciated that the prior art video signal control circuit including an automatic brightness limiting circuit does not permit the reproduction of viewable images with the accurate fidelity acceptable to a viewer. More particularly, a dark portion of the received image is subjected to undesirable deterioration as a result of the operation of the prior art automatic brightness limiting circuit.

The present invention, now to be described, obviates the foregoing disadvantages and serves to faithfully reproduce a video image in response to received video signals notwithstanding the operation of the brightness limiting circuit provided therein to prevent excessive beam current from flowing through the cathode ray tube high voltage generating circuit. As will now be described, the maximum brightness of the displayed image is limited while that portion of the image admitting of low brightness levels is maintained at approximately the same brightness. Stated otherwise, the high amplitude portion of the received video signal is appropriately reduced, whereas the low amplitude portion thereof is maintained at substantially its received value. Concurrently therewith, the contrast of the displayed image is adjusted to avoid deterioration of the dark portion of the displayed image. This is obtained by reducing the contrast of the image.

Figure 3:
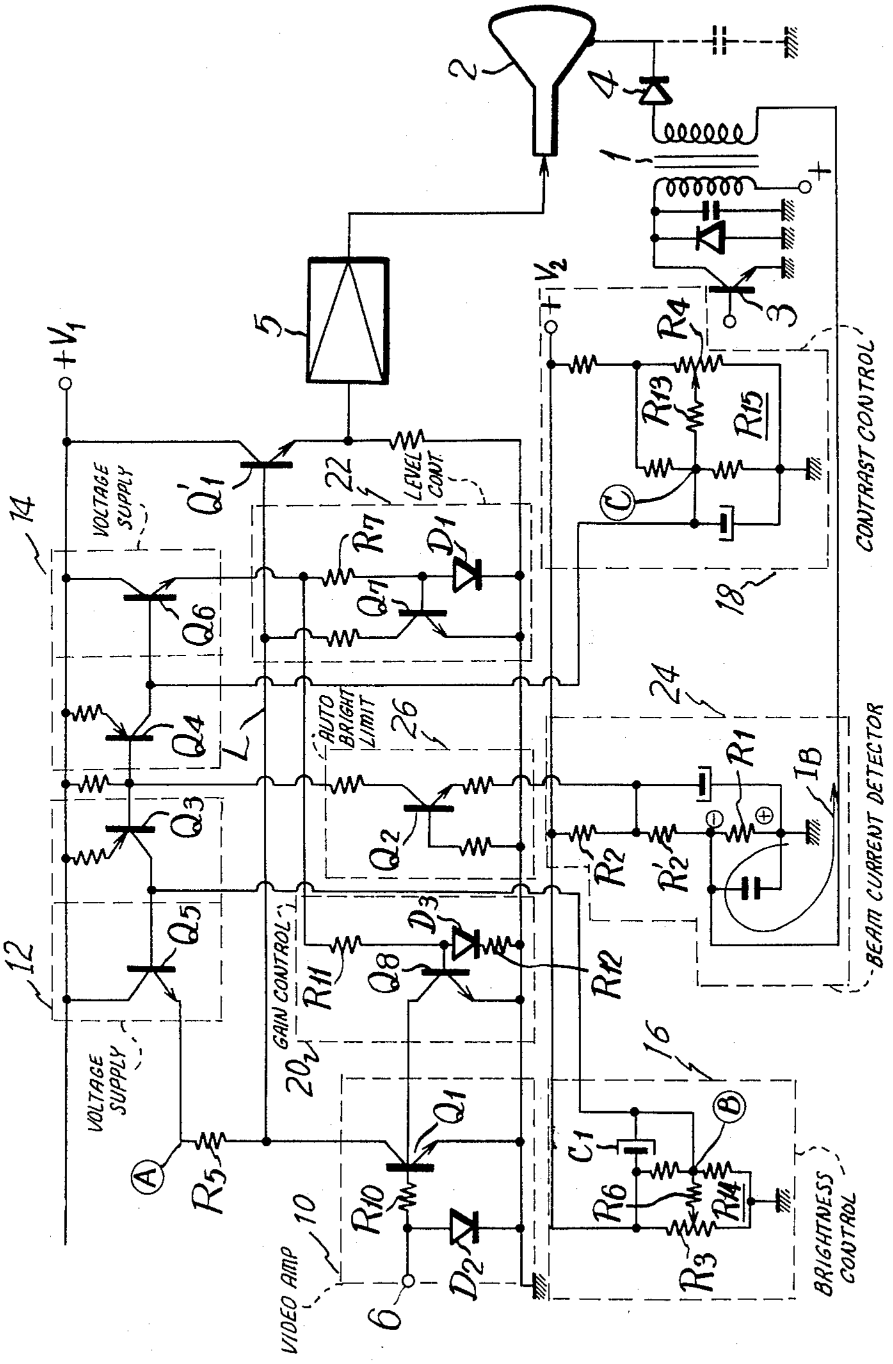
FIG. 3 is a schematic circuit diagram showing an exemplary embodiment of an improved video signal circuit in accordance with the present invention.

Referring now to FIG. 3, there is illustrated therein video amplifying means 10, first voltage supply means 12, second voltage supply means 14, brightness control means 16, contrast control means 18, gain control means 20, level control means 22, beam current detecting means 24 and automatic brightness limiting means 26. Also illustrated is the high voltage generating circuit through which the beam current $I_B$ flows to the anode of cathode ray tube 2. The high voltage generating circuit is comprised of flyback transformer 1, switching transistor 3, rectifying diode 4 and resistor $R_1$. These components are substantially identical to the high voltage generating circuit previously described with respect to FIG. 1. Accordingly, in the interest of brevity, further description thereof is not provided.

Video amplifying means 10 is coupled to input terminal 6 and is adapted to amplify a received video signal and to supply said amplified video signal to signal transmission channel L. An output transistor $Q'_1$ couples the signal transmission channel L to a further video amplifier 5 whereat the video signal is subjected to a final stage of amplification prior to the application thereof to cathode ray tube 2. It is, of course, appreciated that the video signal supplied from video amplifying means 10 over signal transmission channel L, through transistor $Q'_1$, through further amplifier 5 to the cathode ray tube is displayed thereon having a brightness level determined by the DC level thereof and a contrast determined by the amplitude thereof. Preferably, signal transmission channel L comprises a conventional conducting lead and transistor $Q'_1$ is coupled between a suitable source of energizing potential $+V_1$ and a reference potential, such as a ground, in emitter-follower configuration.

Video amplifying means 10 comprises transistor $Q_1$ having an emitter electrode coupled to ground and a collector electrode adapted to be supplied with voltage from voltage supplying means 12 via resistor $R_5$. Additionally, the collector electrode of transistor $Q_1$ is coupled to signal transmission channel L. Current limiting resistance means $R_{10}$ is interposed between input terminal 6 and the base electrode of the transistor $Q_1$. Additionally, a diode $D_2$ is interconnected between the input terminal 6 and the emitter electrode of transistor $Q_1$ for biasing said transistor. The base electrode of transistor $Q_1$ is further connected to gain control means 20 whereby the amplification of a video signal supplied to input terminal 6 is controlled.

Gain control means 20 comprises transistor $Q_8$ connected in shunt relationship with respect to the base electrode of transistor $Q_1$. Accordingly, a series circuit is provided from the base electrode of transistor $Q_1$ across the collector and emitter electrodes of transistor $Q_8$ to ground. The base electrode of transistor $Q_8$ is coupled to voltage supply means 14 via resistor $R_{11}$. The base electrode is further biased by the series connection to ground formed by diode $D_3$ and resistor $R_{12}$.

Voltage supply means 12 is coupled to a suitable source of energizing potential $+V_1$ and is comprised of a current source connected to a voltage source. The current source is formed by transistor $Q_3$, which may preferably comprise a PNP transistor having an emitter electrode coupled, via a suitable emitter resistor, to the source of energizing potential $+V_1$ and a collector electrode coupled to the voltage source. The base electrode of transistor $Q_3$ may preferably be biased by a suitable base resistor. The voltage source comprises a transistor $Q_5$ disposed in an emitter-follower configuration having a base electrode connected to the aforementioned collector electrode of transistor $Q_3$ and an emitter electrode coupled via resistor $R_5$ to the junction defined by video amplifying means 10 and signal transmission channel L. The base electrode of transistor $Q_5$ is additionally coupled to brightness control means 16. It is appreciated that, in emitter-follower configuration, the output voltage supplied by transistor $Q_5$ is substantially equal to the input voltage applied to the base electrode thereof.

Voltage supply means 14 is substantially identical to voltage supply means 12 and, therefore, comprises a current source comprised of PNP transistor $Q_4$ connected to a voltage source comprised of transistor $Q_6$ disposed in emitter-follower configuration. The base electrode of transistor $Q_6$, in addition to being connected to the collector electrode of transistor $Q_4$, is coupled to contrast control means 18. The voltage provided at the emitter electrode of transistor $Q_6$ is adapted to be a gain determining voltage coupled to the base electrode of transistor $Q_8$ of gain control means 20 by resistor $R_{11}$ and additionally, a biasing voltage supplied to the base electrode of transistor $Q_7$ included in level control means 22 via resistor $R_7$.

The level control means 22 is coupled to signal transmission channel L and is adapted to vary the DC potential applied to the signal transmission channel in accordance with the biasing voltage supplied thereto. Accordingly, transistor $Q_7$ included in the level control means is connected in shunt relationship to the signal transmission channel L via a suitable collector resistor. It may be appreciated that, as transistor $Q_7$ increases in conductivity, a greater portion of the DC potential applied to signal transmission channel L is shunted to ground. As illustrated, a biasing diode $D_1$ is provided across the base-emitter junction of transistor $Q_7$.

Brightness control means 16 includes an output terminal coupled to voltage supply means 12 such that a manual adjustment in the brightness control means results in a corresponding change in the DC potential supplied to resistor $R_5$ by transistor $Q_5$. Accordingly, the brightness control means comprises a suitably adjustable resistor $R_3$ connected from a source of energizing potential $+V_2$ to ground and having a movable contact thereof coupled, via resistor $R_6$, to the base electrode of transistor $Q_5$. In the illustrated embodiment, as the movable contact of resistor $R_5$ is moved upwardly, an increase in voltage is applied to the base electrode of transistor $Q_5$ thereby increasing the conductivity of the transistor. Consequently, an increase in DC potential is applied via resistor $R_5$ to the video amplifying means 10 and to the signal transmission channel L. It should here be noted that as the DC level applied to the signal transmission channel L increases, the brightness of the image displayed by cathode ray tube 2 decreases. Alternatively, as the movable contact of resistor $R_3$ is moved downwardly, the voltage coupled to the base electrode of transistor $Q_5$ decreases to thereby decrease the DC potential supplied to video amplifying means 10 and signal transmission channel L. It is appreciated that the movement or setting of the movable contact of resistor $R_3$ may be manually effected by a viewer of the displayed image. A conventional filter capacitor $C_1$ is connected in shunt relationship with respect to the series combination of resistor $R_3$ and resistor $R_6$ to thereby provide a gradual decrease in the voltage supplied to the base electrode of transistor $Q_5$ when a power source switch, not shown, is initially turned on. Accordingly, as the voltage applied to transistor $Q_5$ gradually decreases, it is appreciated that the brightness of the display screen of the cathode ray tube 2 gradually increases.

A further resistor $R_{14}$ is provided between the collector electrode of transistor $Q_3$ and ground to thereby generate an appropriate voltage in response to a current flowing through transistor $Q_3$ for a purpose soon to be described. It is appreciated that the voltage provided by resistor $R_{14}$ in response to the conductivity of transistor $Q_3$ results in the application of a potential to the base electrode of transistor $Q_5$.

Contrast control means 18 is substantially similar to brightness control means 16 and includes a variable resistance element $R_4$, such as a potentiometer, having a movable contact coupled via resistor $R_{13}$ to voltage supply means 14. Resistor $R_4$ is connected in a series circuit extending from the source of potential $+V_2$ to ground to develop a suitable voltage at the output terminal thereof in response to an appropriate adjustment or setting of the movable contact. Accordingly, the output terminal of the contrast control means is connected to the base electrode of transistor $Q_6$ included in voltage supply means 14. Contrast control means 18 further includes a resistor $R_{15}$ connected in series between the collector electrode of transistor $Q_4$ and ground to develop a corresponding potential thereacross in response to current flowing through transistor $Q_4$. Thus, resistor $R_{15}$ serves to provide the base electrode of transistor $Q_6$ with a voltage determined by the conductivity of transistor $Q_4$.

In the apparatus thus far described, it may be appreciated that an adjustment in the movable contact of resistor $R_3$ effects a variation in the base voltage applied to transistor $Q_5$ of voltage supply means 12, resulting in a corresponding variation in the output voltage supplied by the voltage supply means to resistor $R_5$ at point A. More particularly, an upward movement of the movable contact of resistor $R_3$ tends to increase the voltage applied to transistor $Q_5$ and the voltage applied to point A. Consequently, an increase in the DC potential applied to signal transmission channel L is provided, resulting in a decrease in the brightness of the image displayed by cathode ray tube 2. It is recognized that the conductivity of transistor $Q_8$ of gain control means 20 is not varied by an adjustment of the brightness control means and, therefore, the gain of video amplifying means 10 is not modified. Therefore, although the DC level of the video signal applied to signal transmission channel L is increased, the amplitude of the information content thereof is not affected and the contrast of the displayed image is not altered. In a similar manner, adjustment of the movable contact of resistor $R_3$ in a downward direction tends to decrease the voltage applied to transistor $Q_5$, resulting in a decrease in DC potential applied to signal transmission channel L. In this instance, the DC level of the video signal transmitted along signal transmission channel L is decreases to thus increase the brightness in the displayed image, whereas the contrast of the displayed image is not varied.

If a viewer elects to modify the contrast of the displayed image, such as by moving the movable contact of resistor $R_4$ in the upward direction to thereby increase the voltage applied to the base electrode of transistor $Q_6$ by contrast control means 18, it is apparent that the output voltage provided by voltage supply means 14 likewise increases. Accordingly, the gain determining voltage applied via resistor $R_{11}$ to the base of electrode $Q_8$ of gain control means 20 increases, resulting in an increase in the conductivity of the transistor. Consequently, the base voltage of transistor $Q_1$ of video amplifying means 10 decreases to correspondingly reduce the gain exhibited by the video amplifying means 10. The amplitude of the video signal transmitted via the signal transmission channel L thus decreases to diminish the contrast of the displayed image. However, as the DC voltage provided at point A of resistor $R_5$ is maintained relatively constant by voltage supply means 12, the decrease in the amplitude of the video signal on signal transmission channel L is accompanied by an increase in the DC potential thereat. This increase in the DC level of the video signal transmitted by signal transmission channel L, if not removed or otherwise moderated, would produce an undesired decrease in the brightness of the image displayed by cathode ray tube 2. The increase in DC level of the video signal is compensated by level control means 22. More particularly, when the output voltage supplied by voltage supply means 14 increases in response to an increase in the voltage produced by contrast control means 18, the bias voltage applied to the base electrode of transistor $Q_7$ via resistor $R_7$ increases. Consequently, the conductivity of transistor $Q_7$ increases to thus provide a DC shunt across signal transmission channel L. Accordingly, the increase in DC level experienced by the amplified video signal is substantially offset and the brightness of the displayed image is, at most, negligibly altered. Here, the increase in DC current flowing through resistor $R_5$ as a result of the decrease in the gain of video amplifying means 10 is shunted to ground by the conducting transistor $Q_7$.

If, now, the movable contact of resistor $R_4$ is adjusted in a downward direction to thereby decrease the voltage supplied to the base electrode of transistor $Q_6$ included in voltage supply means 14, it is appreciated that a corresponding decrease in the gain determining voltage coupled to the base electrode of transistor $Q_8$ by resistor $R_{11}$ is effected. Accordingly, the conductivity of the transistor decreases, resulting in an increase in the base-emitter voltage at transistor $Q_1$. Hence, the gain of video amplifying means 10 is increased to provide a relatively large amplitude to the video signals transmitted via signal transmission channel L. The contrast of the displayed image is thus enhanced.

It is recalled that the voltage provided at point A of resistor $R_5$ is here maintained relatively constant. Accordingly, an increase in the amplitude of amplified video signals is accompanied by a reduction in the DC level thereof. This, of course, would result in an undesirable increase in the brightness of the displayed image. Accordingly, as the output voltage supplied by voltage supply means 14 is decreased in accordance with the adjustment of contrast control means 18, the biasing voltage applied to the base electrode of transistor $Q_7$ is correspondingly decreased. Hence, the conductivity of transistor $Q_7$ is decreased, thus reducing that portion of the DC current flowing therethrough to ground from the signal transmission channel L. Therefore, the expected change in the DC level of the amplified video signals resulting from an increase in the gain of video amplifying means 10 is compensated by a reduction of the conductivity of transistor $Q_7$. As the decrease in the DC potential at signal transmission channel L is compensated by level control means 22, it is appreciated that an adjustment in contrast control means 18 results in, at best, a negligible alteration in the brightness of the displayed image.

As noted hereinabove, the instant invention contemplates automatic brightness limiting means to prevent excessive beam current from flowing through the high voltage generating circuit coupled to the cathode ray tube 2 while, at the same time, degradation of the displayed image is avoided. Accordingly, automatic brightness limiting means 26 is coupled to voltage supply means 12 and 14 and is adapted to be activated in response to the sensing of excessive beam current by beam current detecting means 24. The beam current detecting means 24 comprises resistor $R_1$ through which beam current $I_B$ flows to the anode of cathode ray tube 2. Accordingly, a suitable voltage drop is provided across resistor $R_1$. Additionally, a voltage dividing circuit comprised of resistors $R_2$ and $R'_2$ are connected in series between the source of potential $+V_2$ and resistor $R_1$. The voltage provided at the junction of resistors $R_2$ and $R'_2$ is utilized as a biasing voltage to maintain automatic brightness limiting means 26 in its quiescent, or nonconducting, state. This voltage provided by the voltage dividing circuit establishes a predetermined value below which it is desired to maintain the average beam current $I_B$, as will soon be described.

Automatic brightness limiting means 26 is comprised of transistor $Q_2$ having its collector-emitter junction connected in series between beam current detecting means 24 and the common connected base electrodes of transistors $Q_3$ and $Q_4$ included in voltage supply means 12 and 14, respectively. More particularly, the collector electrode of transistor $Q_2$ is connected, via a suitable collector resistor, to the aforementioned common connected base electrodes. The emitter electrode of transistor $Q_2$ is connected via a suitable emitter resistor to the voltage divider defined by resistors $R_2$ and $R'_2$. The base electrode of transistor $Q_2$ is here coupled to a reference potential, such as ground.

In operation, it is appreciated that the voltage drop normally provided across resistor $R_1$ by the average beam current $I_B$ is not sufficient to cancel the normally positive voltage provided by the voltage divider circuit defined by resistors $R_2$ and $R'_2$ and supplied to the emitter electrode of transistor $Q_2$. Accordingly, the latter transistor is maintained in its quiescent nonconducting, or off, state. As current does not flow through transistor $Q_2$, a relatively high potential is provided at the common connected base electrodes of transistors $Q_3$ and $Q_4$, thus biasing these transistors into their nonconducting states. Hence, the aforedescribed operation of the illustrated video signal control circuit is not affected.

However, when the received video signal admits of a sufficient amplitude such that the average beam current $I_B$ supplied to the anode of cathode ray tube 2 now exceeds the predetermined value therefor, a relatively negative potential is applied to the junction defined by resistors $R_2$ and $R_1$, attributed to the voltage drop across resistor $R_1$ in response to the average beam current $I_B$ flowing therethrough, to reduce the biasing voltage provided by the voltage divider circuit. Consequently, the voltage now applied to the emitter electrode of transistor $Q_2$ is no longer adequate to maintain the transistor in its quiescent nonconducting state. Hence, transistor $Q_2$ is sufficiently forward biased to permit current to flow from the common connected base electrodes of transistors $Q_3$ and $Q_4$ through the collector-emitter junction of transistor $Q_2$. It is appreciated that the magnitude of current flowing through transistor $Q_2$ is directly related to the amount by which the average beam current $I_B$ exceeds the predetermined value. Furthermore, as transistor $Q_2$ is biased to its conducting state, the voltage drop now provided at the base electrodes of transistors $Q_3$ and $Q_4$ is sufficient to bias these latter transistors into their respective conducting states. Current then flows from the source of energizing potential $+V_1$, through the emitter resistor of transistor $Q_3$ and through said transistor to ground via resistor $R_{14}$. Similarly, current now flows from the source of energizing potential $+V_1$, through the emitter resistor of transistor $Q_4$, through said transistor to ground via resistor $R_{15}$. It is, of course, recognized that the current flow through the respective resistors $R_{14}$ and $R_{15}$ produces corresponding voltage drops thereacross at points B and C, respectively. Therefore, the voltage at point B of brightness control means 16 is applied to the base electrode of transistor $Q_5$ to increase the DC level applied to signal transmission channel L by voltage supply means 12 via resistor $R_5$. Accordingly, as the DC level of the amplified video signal is increased, the brightness of the displayed image in response to said amplified video signal is decreased. In this manner, automatic brightness limiting means 26 cooperates with beam current detecting means 24 and voltage supply means 12 to prevent the brightness of the displayed image from exceeding a predetermined amount and, consequently, the average beam current $I_B$ is restrained from excessive values that would present unacceptable hazards to the high voltage circuitry. Of course, as the average beam current $I_B$ decreases, the conductivity of transistor $Q_2$ likewise decreases to thereby reduce the current flowing through the transistor $Q_3$ and series connected resistor $R_{14}$. Hence, the DC level applied to signal transmission channel L by voltage supply means 12 is diminished to thereby permit the brightness of the displayed image to be increased.

Since the voltage provided at point C of contrast control means 18 increases when the conductivity of transistor $Q_4$ is established as a result of an excessive average beam current $I_B$, the problem heretofore present in prior art video control circuits incorporating automatic brightness limiting circuitry and as previously described with respect to curve b illustrated in FIG. 2, is here obviated. More particularly, the present invention permits the faithful reproduction of those darker portions of the reproduced image in response to the received video signals admitting of relatively low amplitude by diminishing the contrast of such reproduced image. In this manner, degradations in the displayed image that would be readily apparent to a viewer are avoided. In particular, the increased voltage at point C of contrast control means 18 serves to increase the voltage supplied by transistor $Q_6$ of voltage supply means 14. Accordingly, the gain determing voltage applied to gain control means 20 is increased, thus reducing the gain exhibited by video amplifying means 10 in the now understood manner. Thus, and as represented by curve *c* depicted in FIG. 2, the amplitude of the amplified video signal is reduced by a greater amount for those video signals admitting of relatively high amplitude than for those video signals admitting of relatively low amplitudes. In this manner, the contrast of the displayed image is diminished to thus avoid deteriorations in the viewed image. Simultaneously therewith, and as effected by voltage supply means 12, the brightness of the displayed image is reduced to thereby decrease the average beam current $I_B$ below the predetermined value therefor.

It may be appreciated that, as the gain determining voltage applied to gain control means 20 by voltage supply means 14 is increased to thereby increase the conductivity of transistor $Q_8$, the conductivity of transistor $Q_7$ included in level control means 22 likewise increases. Hence, the variations in DC potential that might be applied to signal transmission channel L as a result of the variation in gain of video amplifying means 10 are compensated by the level control means to thereby minimize undesired variations in the brightness of the displayed image attributed to the alteration of the contrast. The present invention is thus effective to sufficiently limit the maximum brightness of a displayed image to avoid damage to the high voltage circuitry, notwithstanding the large amplitudes exhibited by the received video signals, while permitting faithful reproduction of the received images by diminishing the contrast thereof during an automatic brightness limiting operation.

Although the present invention has been described in detail with respect to television receiving systems, it should be readily apparent to one of ordinary skill in the art that the disclosed apparatus admits of ready application to any system employing a cathode ray tube wherein the brightness and contrast of a displayed image are to be independently, manually adjustable and wherein the maximum brightness of said displayed image is to be restrained to a predetermined level. Futhermore, it should be appreciated that the precise nature of the manually adjustable brightness control means 16 and the manually adjustable contrast control means 18 admits of various changes and modifications. Accordingly, other adjustable impedance means or adjustable voltage generating means may be provided in place of the described variable resistors $R_3$ and $R_4$. Moreover, the illustrated transistor devices may admit of polarity opposite to that described hereinabove and may further include FET transistors or the like. Individual transistors may be replaced by suitable multi-element transistor devices adapted to perform in the manner described hereinabove. It is specifically contemplated that the instant video signal control circuit may be disposed in an integrated circuit configuration thereby minimizing the cost of production and, additionally, substantially enhancing the longevity and reliability thereof.

Therefore, while the invention has been particularly shown and described with reference to a specific embodiment thereof, it will be obvious to those skilled in the art that the foregoing and various other changes and modifications in form and details may be made without departing from the spirit and scope of the invention. It is intended that the appended claims be interpreted as including all such changes and modifications.

What is claimed is:

1. A video signal control circuit, comprising:

Video amplifier means for amplifying a video signal supplied to an input terminal thereof;

a signal transmission channel connected to said video amplifier means at a junction for transmitting a video signal applied thereto by said video amplifier means to a cathode ray tube;

gain control means coupled to said video amplifier means for controlling the gain of said video amplifier means in accordance with a gain determining voltage;

first voltage supply means coupled to said video amplifier means and said signal transmission channel for supplying a voltage thereto;

second voltage supply means coupled to said gain control means for supplying a voltage thereto;

brightness control means coupled to said first voltage supply means for varying the voltage supplied by said first voltage supply means to thereby vary the DC potential applied to said signal transmission channel, whereby the brightness of an image displayed by said cathode ray tube in response to said video signal is varied;

contrast control means coupled to said second voltage supply means for varying the voltage supplied by said second voltage supply means to thereby vary the gain of said video amplifier means determined by said gain control means, whereby the contrast of an image displayed by said cathode ray tube is varied; and level control means coupled to said signal transmission channel and responsive to said voltage supplied by said second voltage supply means for varying the DC potential on said signal transmission channel.

2. A video signal control circuit in accordance with claim 1 wherein said level control means comprises a level control transistor having collector and emitter electrodes coupled in shunt relationship to said signal transmission channel and a base electrode coupled to said second voltage supply means.

3. A video signal control circuit in accordance with claim 1 wherein said video amplifier means comprises a video amplifier transistor and said gain control means comprises a gain control transistor, said video amplifier transistor having collector and emiiter electrodes coupled in series to said first voltage supply means and a base electrode coupled to said input terminal, said gain control transistor having collector and emitter electrodes connected in shunt relationship with said base and emitter electrodes of said video amplifier transistor and a base electrode coupled to said second voltage supply means.

4. A video signal control circuit in accordance with claim 3 further comprising an input resistor to couple said input terminal to said video amplifier transistor base electrode; and a diode interconnected between said input terminal and said video amplifier transistor emitter electrode.

5. A video signal control circuit, comprising:

video amplifier means for amplifying a video signal supplied to an input terminal thereof;

a signal transmission channel coupled to said video amplifier means for transmitting a video signal applied thereto by said video amplifier means to a cathode ray tube;

gain control means coupled to said video amplifier means for controlling the gain of said video amplifier means in accordance with a gain determining voltage;

first voltage supply means coupled to both said video amplifier means and said signal transmission channel for supplying a DC voltage thereto; second voltage supply means coupled to said gain control means for supplying DC voltage thereto;

beam current detecting means coupled to said cathode ray tube for detecting when said beam current exceeds a predetermined value;

brightness control means coupled to said first voltage supply means for varying the DC voltage supplied to said signal transmission channel by said first voltage supply means, whereby the brightness of an image displayed by said cathode ray tube in response to said video signal is varied;

contrast control means coupled to said second voltage supply means for varying the DC voltage supplied to said gain control means by said second voltage supply means to thereby vary the gain of said video amplifier means determined by said gain control means, whereby the contrast of an image displayed by said cathode ray tube is varied; and brightness limiting means coupled to said first and second voltage supply means and responsive to said detected cathode ray tube beam current in excess of said predetermined value for simultaneously varying the DC voltage supplied to said signal transmission channel by said first voltage supply means and the DC voltage supplied to said gain control means by said second voltage supply means, whereby the brightness of an image displayed by said cathode ray tube in response to said video signal is limited and the contrast of said image is reduced.

6. A video signal control circuit in accordance with claim 5 wherein said brightness limiting means comprises transistor switch means connected in common relationship to said first and second voltage supply means and adapted to be activated by said beam current detecting means.

7. A video signal control circuit in accordance with claim 6, wherein said transistor switch means comprises a transistor having collector and emitter electrodes interconnected between said first and second voltage supply means and said beam current detecting means and adapted to exhibit a conducting state when said beam current detecting means detects that said beam current exceeds said predetermined value.

8. A video signal control circuit, comprising:

video amplifier means for amplifying a video signal supplied to an input terminal thereof;

a signal transmission channel coupled to said video amplifier means for transmitting a video signal applied thereto by said video amplifier means to a cathode ray tube;

gain control means coupled to said video amplifier means for controlling the gain of said video amplifier means in accordance with a gain determining voltage;

first voltage supply means coupled to said video amplifier means and said signal transmission channel for supplying a voltage thereto;

second voltage supply means coupled to said gain control means for supplying a voltage thereto;

each of said first and second voltage supply means comprising a current source connected to a voltage source, said voltage source selectively providing an output voltage determined by a control voltage applied thereto and an output current provided by said current source, and said current source providing an output current determined by a regultaing voltage applied thereto;

beam current detecting means coupled to said cathode ray tube for detecting when said beam current exceeds a predetermined value;

brightness control means coupled to said first voltage supply means for varying the voltage supplied by said first voltage supply means to thereby vary the DC potential applied to said signal transmission channel, whereby the brightness of an image displayed by said cathode ray tube in response to said video signal is varied;

contrast control means coupled to the voltage source of said second voltage supply means for varying the output voltage supplied by said voltage source of said second voltage supply means to thereby vary the gain of said video amplifier means determined by said gain control means, whereby the contrast of an image displayed by said cathode ray tube is varied; and brightness limiting means coupled to the respective current sources of said first and second voltage supply means and responsive to said detected cathode ray tube beam current in excess of a predetermined value for varying the output currents provided by said respective current sources to thereby simultaneously vary the DC potential applied to said signal transmission channel and the gain of said video amplifier means determined by said gain control means, whereby the brightness of an image displayed by said cathode ray tube in response to said video signal is limited and the contrast of said image is reduced.

9. A video control circuit in accordance with claim 8 wherein said current source comprises a first transistor having a current output electrode and a control electrode, said control electrode being connected to said brightness limiting means for receiving a regulating voltage therefrom, and said voltage source comprises a second transistor having a control electrode connected to said current output electrode and a voltage output electrode; said voltage output electrode included in said first voltage supply means being coupled to said video amplifier means and said signal transmission channel, and said voltage output electrode included in said second voltage supply means being coupled to said gain control means.

10. A video control circuit in accordance with claim 9 wherein said brightness control means is connected to said second transistor control electrode included in said first voltage supply means and said contrast control means is connected to said second transistor control electrode included in said second voltage supply means; and said brightness limiting means is connected in common relationship to the control electrodes of said first transistors included in said first and second voltage supply means.

11. A video signal control circuit in accordance with claim 10 wherein said brightness control means and said contrast control means each comprises variable resistance means for producing a variable control voltage in accordance with a manual operation thereof.

12. A video signal control circuit, comprising:

a video amplifying transistor for amplifying a video signal supplied to an input terminal coupled thereto;

a signal transmission channel coupled to said video amplifying transistor for transmitting a video signal applied thereto by said video amplifying transistor to a cathode ray tube;

a gain control transistor coupled to said video amplifying transistor for controlling the gain of said video amplifying transistor in accordance with a gain determining voltage;

first voltage supply means comprised of a first current source transistor having a current output electrode and a control electrode and a first voltage source transistor having a control electrode connected to said current output electrode and a voltage output electrode connected in common relationship to said video amplifying transistor and said signal transmission channel;

second voltage supply means comprised of a second current source transistor having a current output electrode and a control electrode and a second voltage source transistor having a control electrode connected to said last-mentioned current output electrode and a voltage output electrode connected to said gain control transistor;

brightness control means connected to said first voltage source transistor control electrode for applying a variable control voltage thereto to thereby vary the DC potential supplied by said first voltage source transistor voltage output electrode, whereby the brightness of an image displayed by said cathode ray tube is varied;

contrast control means connected to said second voltage source transistor control electrode for applying a variable control voltage thereto to thereby vary the gain determining voltage supplied to said gain control transistor by said second voltage source transistor voltage output electrode, whereby the contrast of an image displayed by said cathode ray tube is varied;

a level control transistor coupled to said signal transmission channel and having a control electrode connected to said second voltage source transistor voltage output electrode for compensating variations in the DC potential applied to said signal transmission channel when said contrast control means causes a variation in said gain determining voltage to thereby minimize variations in the brightness of an image displayed by said cathode ray tube when the contrast thereof is varied;

beam current detecting means coupled to said cathode ray tube for detecting when the cathode ray tube beam current exceeds a predetermined value; and a brightness limiting transistor coupled to the control electrodes of said first and second current source transistors, respectively, and responsive to a detected excessive beam current for varying the voltage applied to said control electrodes to correspondingly vary the respective output current produced by said first and second current source transistors, whereby the voltages produced at the voltage output electrodes of said first and second voltage source transistors are varied.

* * * * *